United States Patent [19]

Reese et al.

[11] Patent Number: 4,610,306

[45] Date of Patent: Sep. 9, 1986

[54] NON-RETARDING FLUID LOSS ADDITIVES FOR WELL CEMENTING COMPOSITIONS

[75] Inventors: Dyke W. Reese, Bakersfield, Calif.; Ray S. Pace, Arlington, Tex.; Lee F. McKenzie, Merriman, Utah

[73] Assignee: Hughes Tool Company, Houston, Tex.

[21] Appl. No.: 683,788

[22] Filed: Dec. 19, 1984

[51] Int. Cl.$^4$ ............................................. E21B 33/138
[52] U.S. Cl. ....................... 166/293; 106/90; 166/295; 523/130
[58] Field of Search ............... 106/90; 166/283, 293, 166/295; 405/266; 523/130

[56] References Cited

U.S. PATENT DOCUMENTS

| | | | |
|---|---|---|---|
| 2,868,753 | 1/1959 | Morgan et al. | 106/90 X |
| 3,140,269 | 7/1964 | Wahl et al. | 523/130 |
| 3,359,225 | 12/1967 | Weisend | 106/90 X |
| 3,491,049 | 1/1970 | Gibson et al. | 106/90 |
| 3,511,314 | 5/1970 | Scott et al. | 166/293 |
| 3,605,898 | 9/1971 | Harrison et al. | 166/293 |
| 3,877,522 | 4/1975 | Knight et al. | 166/295 |
| 3,931,096 | 1/1976 | Guilbault et al. | 166/293 |
| 3,943,996 | 3/1976 | Guilbault et al. | 166/293 |
| 3,994,852 | 11/1976 | Adams et al. | 166/295 |
| 4,015,991 | 4/1977 | Persinski et al. | 106/90 |
| 4,235,291 | 11/1980 | Messenger | 166/293 X |
| 4,258,790 | 3/1981 | Hale | 166/282 |
| 4,413,681 | 11/1983 | McKenzie | 166/283 |

*Primary Examiner*—George A. Suchfield
*Attorney, Agent, or Firm*—Charles D. Gunter, Jr.

[57] ABSTRACT

A well bore cementing composition and method are shown in which a hydraulic cement, water and fluid loss additive are combined to form a cementing slurry. The fluid loss additive is a copolymer of a first monomer of dimethyl-diallyl ammonium chloride and a second anionic monomer. The monomer ratio of the non-ionic, water soluble monomer to the anionic monomer is in the range from about 85:15 to 95:5, and the copolymer has a molecular weight in the range from about 200,000 to 400,000.

3 Claims, No Drawings

NON-RETARDING FLUID LOSS ADDITIVES FOR WELL CEMENTING COMPOSITIONS

BACKGROUND OF THE INVENTION

1. Field of the Invention

This invention relates generally to oil well cementing compositions and specifically to polymeric fluid loss additives for such compositions and methods of making the same for controlling fluid loss during cementing operations.

2. Cross Reference to Related Applications

This application is related to the copending application, Ser. No. 683,787; entitled "NON-RETARDING FLUID LOSS ADDITIVES FOR WELL CEMENTING COMPOSITIONS", by Lee Frederick McKenzie, Paul Michael and Dyke William Reese, filed concurrently herewith.

3. Description of the Prior Art

Cement compositions are used in the oil and gas industry to cement the annular space in the well bore between the surrounding formation and pipe or casing. Typically, the cement slurry is pumped down the inside of the casing and back up the outside of the casing through the annular space. The amount of water which is used in forming the cement slurry will vary depending upon the type of hydraulic cement selected and the job conditions at hand. The amount of water used can vary over a wide range, depending upon such factors as the required consistency of the slurry and upon the strength requirement for the particular job. Many times, the hydraulic cement must be placed within or next to a porous medium, for example, earthern strata in the well bore. When this happens, water tends to filter out of the slurry and into the strata during the settling of the cement. Many difficulties are related to an uncontrolled fluid loss of this type such as an uncontrolled setting rate, improper placement of the slurry, impaired strength properties, and contamination of the surrounding strata. These conditions are all undesirable in oil and gas well cementing operations.

In order to lessen the loss of fluid from the aqueous cement slurry, various materials have been employed in the past. One such material was a copolymer of an acrylamide and acrylic acid. This fluid loss material had the ability to maintain fluid loss control over a wide temperature range, functioned well in the presence of salts, and was superior to cellulouse base additives when chloride salt accelerators were present. In spite of these advantages, the copolymer of acrylamide and acrylic acid exhibited latent retarding effects, thereby lessening the usefulness of such material at lower temperatures.

In a study of the retarding effects associated with the acrylamide/acrylic acid copolymer, it was theorized that the source of the retarding effect was the generation of carboxyl groups by gradual hydrolysis of the amide functionality. The present invention is the discovery that the latent retarding effects of the acrylamide/acrylic acid type copolymers can be eliminated by substituting for the acrylamide certain cationic and non-ionic monomers.

SUMMARY OF THE INVENTION

It has now been discovered that novel fluid loss additives can be provided for oil well cementing compositions which additives comprise copolymers of a first anionic monomer and a second non-ionic or cationic monomer. The anionic monomer has a functionality selected from the group consisting of carboxylate and sulfonate. Preferably, the anionic monomer is selected from the group consisting of acrylic acid, and methacrylic acid. The non-ionic or cationic monomer is preferably selected from the group consisting of n-vinylpyrrolidone and dimethyl-diallyl ammonium chloride. The monomer ratio of the anionic monomer to the non-ionic or cationic monomer is in the range from about 5:95 to 15:85 and the copolymer has a molecular weight in the range from about 200,000 to 400,000.

A method of cementing a well bore is also shown which comprises the step of mixing together a hydraulic cement, water in an amount sufficient to produce a pumpable slurry, and a fluid loss additive of the above type. The cement composition is pumped to the desired location in the well bore and allowed to harden to a solid mass. The novel copolymers of the invention can be used to provide cement compositions with adequate fluid loss control which are non-retarding at lower temperatures.

Additional objects, features and advantages will be apparent in the description which follows.

DETAILED DESCRIPTION OF THE INVENTION

The term "hydraulic cement" is meant to encompass any organic cement that hardens or sets under water. Hydraulic cements, for example, include Portland cements, aluminous and Pozzolan cements, and the like. The term "hydraulic cement" is also intended to include cements having minor amounts of extenders such as bentonite, gilsonite, and also is intended to include cements used either without any appreciable sand or aggregate material or such cements admixed with a granular filling material such as sand, ground limestone, and the like. Thus, for example, any of the class "A-H" and "J" cements as listed in the "API Spec 10 First Addition January 1982" are suitable for this purpose. The strength enhancers such as silica powder can be employed.

Mixing water is utilized with the dry cement compositions to produce a fluid pumpable slurry of suitable consistency. "API Spec. 10 First Edition, January 1982", which is known in the cement industry, describes an approved apparatus and method for measuring the consistency of cement slurries in terms of Bearden units of consistency (Bc). A pumpable slurry should measure in the range from about 2–20 Bc, and preferably be in the range of 5 to 11 Bc. Slurries thinner than 5 Bc will tend to have greater particle settling and free water generation. Slurries thicker than about 11 Bc become increasingly difficult to pump.

Depending upon the particular slurry and intended conditions of use, mixing water is utilized in the slurry of the present invention in the range from about 30 to 150 weight percent based upon the dry weight of cement and preferably is in the range of about 35 to 90 weight percent.

The present cement compositions, in addition to hydraulic cement and water in a sufficient amount to produce a pumpable slurry, include a polymeric fluid loss additive. The polymeric fluid loss additives comprise copolymers of a first anionic monomer and a second non-ionic or cationic monomer. The monomer ratio of the anionic monomer to the non-ionic or cationic monomer is in the range from about 5:95 to 15:85 and the copolymer has a molecular weight in the range from about 200,000 to 400,000.

Suitable anionic monomers capable of being polymerized to form the polymeric fluid loss additives include acrylic acid, methacrylic acid, 2-acrylamide-2-methyl-propane sulfonic acid, maleic anhydride and the like. Suitable cationic monomers capable of being polymerized include dimethyl-diallyl ammonium chloride, dimethylamino-ethyl methacrylate, allyltrimethyl ammonium chloride, and the like. Suitable non-ionic or neutral monomers include butadiene, N-vinyl-2-pyrrolidone, methyl vinyl ether, methyl acrylate, maleic anhydride, styrene, vinyl acetate, methyl methacrylate, and acrylonitrile.

The polymeric fluid loss additives used in the cement compositions of the invention can be prepared using established techniques of "solution polymerization." This general technique calls for dissolving the selected monomers in a suitable solvent, followed by catalyzing the reaction to form the polymer. The following U.S. patents teach the general techniques used in the preparation of polymeric fluid loss additives of the type used in the cementing compositions of this invention the disclosure of which is hereby incorporated by reference: U.S. Pat. No. 4,015,991, "Low Fluid Loss Cementing Compositions Containing Hydrolyzed Acrylamide/2-Acrylamido-2-Methylpropane Sulfonic Acid Derivitive Copolymers and Their Use", issued Apr. 5, 1977, to Persinski et al; U.S. Pat. No. 3,994,852, "Low Fluid Loss Cementing Compositions Containing Polyvinylpyrrolidone-Polyacrylamide Triblock Polymers and Their Use", issued Nov. 30, 1976, to Adams, et al; U.S. Pat. No. 2,868,753, "Hydraulic Cement Compositions Containing Acrylamide-Acrylic Acid Copolymers and Method of Making Same."

Preferably the copolymers of the invention are prepared from monomers of similar reactivity so that the resulting polymer has a random charge distribution. Charge from sulfonate monomers appears to give less retardation than carboxylate monomers. On the other hand, the use of carboxylate monomers appears to give somewhat better fluid loss control, particularly in cement slurries containing salt. Although the use of carboxylated monomers results in slight retardation, monovalent as well as divalent chloride salts, such as CaCl$_2$, can be utilized to accelerate the setting time of the slurry without adversely affecting fluid loss control.

Preferably, the anionic monomer is selected from the group consisting of acrylic acid, and methacrylic acid. The non-ionic or cationic monomer is preferably selected from the group consisting of n-vinylpyrrolidone and dimethyl-diallyl ammonium chloride. The non-ionic, water soluble monomer is selected based upon an ability to resist alkaline hydrolysis in the cement slurry and upon an inability to complex calcium ions.

The most preferred polymeric fluid loss additive is a copolymer of n-vinylpyrrolidone and acrylic acid in a monomer ratio of 90:10 and having a molecular weight in the range from 200,000–400,000.

The fluid loss additive of the invention, in the dry form, is preferably present in the range from about 0.1 to 1.0 weight percent based upon the dry weight of cement, most preferably in the range from about 0.3 to 0.6 weight percent based upon the dry weight of cement.

The fluid loss materials of the invention can also include, as a companion material, a dispersant type material. Dispersants, also called densifiers, are commercially available for use in oil and gas well cementing. A suitable material is the sodium salt of naphthalene sulfonic acid condensed with formaldehyde and is a low molecular weight compound, i.e., on the order of 1,000 to 3,000. The dispersant, if present, is preferably used in the range from about 0 to 3% by weight, based upon the dry weight of cement.

In the method of cementing a well bore with the present additive, a hydraulic cement, water and the fluid loss additive to the invention are mixed together to form a pumpable slurry. The cement slurry so prepared is then pumped to the desired location in the well bore and allowed to harden to form a solid mass.

The following examples are intended to be illustrative of the invention:

EXAMPLE I

A copolymer was prepared of n-vinylpyrrolidone (NVP) and acrylic acid (AA) in a monomer ratio of 90:10 and having a molecular weight in the range of 400,000. The copolymer was then added to a number of exemplary cement slurries formed using class H cement, water, and various existing cement additives. The consistency, fluid loss, thickening time and compressive strength tests were performed in accordance with the standard procedures contained in the "API Spec. 10, First Edition, January 1982" which is incorporated herein by reference. The results are shown in Tables I, II, III and IV.

The following abbreviations are used in the tables:

| Abbreviation | Meaning |
|---|---|
| AA/NVP | copolymer acrylic acid and n-vinylpyrrolidone |
| AA/DMDAAC | copolymer of acrylic acid and dimethyl-diallyl ammonium chloride |
| DD | dry naphthalene sulfonic acid dispersant |
| LD | liquid naphthalene sulfonic acid dispersant |
| CaCl$_2$ | calcium chloride |
| KCl | potassium chloride |
| NaCl | sodium chloride |
| DR | dry lignosulfonate retarder |
| BRl | dry blended retarder containing hydroxyethyl cellulose |
| AA/AM | copolymer of acrylamide and acrylic acid in 90:10 monomer ratio |

TABLE I

ALL MIXES ARE 1:0:0 (LONE STAR CEMENT) + FRESH WATER
ALL PERCENTAGES ARE BY WEIGHT OF CEMENT

| Cement Class | % Water Fresh | % AA/NVP | % DD | % CaCl$_2$ | % NaCl | % KCl | % DR | Temp (°F.) | Consistency Start/Finish | API F.L. cc/30 Min |
|---|---|---|---|---|---|---|---|---|---|---|
| H | 38 | .6 | | | | | | 80 | 13/14 | 172 |
| H | 38 | .6 | .3 | | | | | 80 | 9/11 | 26 |
| H | 38 | .6 | .3 | | | | | 118 | 9/10 | 50 |
| H | 38 | .6 | .3 | | | | | 140 | 10/9 | 48 |

TABLE I-continued

ALL MIXES ARE 1:0:0 (LONE STAR CEMENT) + FRESH WATER
ALL PERCENTAGES ARE BY WEIGHT OF CEMENT

| Cement Class | % Water Fresh | % AA/NVP | % DD | % CaCl$_2$ | % NaCl | % KCl | % DR | Temp (°F.) | Consistency Start/Finish | API F.L. cc/30 Min |
|---|---|---|---|---|---|---|---|---|---|---|
| H | 38 | .6 | .3 | | | | | 167 | 10/8 | 49 |
| H | 38 | .6 | .3 | | | | .3 | 197 | 9/14 | 95 |
| H | 38 | .6 | .3 | .25 | | | | 80 | 8/11 | 39 |
| H | 38 | .6 | .3 | .50 | | | | 118 | 10/10 | 80 |
| H | 38 | .6 | .3 | | 10 | | | 118 | 10/10 | 51 |
| H | 38 | .6 | .3 | | | 3 | | 118 | 5/8 | 99 |
| H | 38 | .4 | .2 | | | | | 140 | 9/8 | 247 |
| A | 46 | .6 | | | | | | 118 | 18/14 | 272 |

The copolymers of AA/NVP provide good consistency, even without a dispersant. Using a dispersant with the AA/NVP copolymers provides superior cement fluid loss control. The use of monovalent and divalent chloride salts in the slurry does not adversely affect fluid loss control.

TABLE II

EFFECT OF FLUID LOSS ADDITIVE ON
THICKENING TIME WITH LONE STAR
CLASS H CEMENT + 38% FRESH WATER

| Mix | Temp (°F.) | Thickening Time (Min) |
|---|---|---|
| 1:0:0 | 118 | 194 |
| 1:0:0 + 0.6% AA/NVP | 118 | 98 |
| 1:0:0 + 0.6% BRl | 118 | 330+ |
| 1:0:0 | 167 | 83 |
| 1:0:0 + 0.6% AA/NVP | 167 | 88 |
| 1:0:0 + 0.6% BRl | 167 | 176 |
| 1:0:0 + 0.6% AA/AM | 167 | 240+ |

The AA/NVP copolymers of the invention provide fluid loss control without unduly retarding the setting time of the cement. The AA/AM copolyers exhibit severe retarding at 167° F.

TABLE III

EFFECT OF FLUID LOSS ADDITIVE ON
THICKENING TIME WITH TRINITY
CLASS H CEMENT + 38% FRESH WATER

| Mix | Temp (°F.) | Thickening Time (Min) |
|---|---|---|
| 1:0:0 | 102 | 197 |
| 1:0:0 + 0.6% AA/NVP | 102 | 204 |
| 1:0:0 + 0.6% BRl | 102 | 291 |
| 1:0:0 | 118 | 153 |
| 1:0:0 + 0.5% AA/NVP | 118 | 111 |
| 1:0:0 + 0.6% BRl | 118 | 253 |
| 1:0:0 | 140 | 70 |

TABLE III-continued

EFFECT OF FLUID LOSS ADDITIVE ON
THICKENING TIME WITH TRINITY
CLASS H CEMENT + 38% FRESH WATER

| Mix | Temp (°F.) | Thickening Time (Min) |
|---|---|---|
| 1:0:0 | 140 | 72 |
| 1:0:0 + 0.6% AA/NVP | 140 | 73 |
| 1:0:0 + 0.6% BRl | 140 | 127 |

TABLE IV

EFFECT OF FLUID LOSS ADDITIVE ON
COMPRESSIVE STRENGTH FOR
CLASS H CEMENT + 38% FRESH WATER

| Mix | Temp (°F.) | Compressive Strength (psi) |
|---|---|---|
| 1:0:0 | 170 | 8371 |
| 1:0:0 + 0.6% BRl | 170 | 4156 |
| 1:0:0 + 0.6% AA/NVP | 170 | 4956 |
| 1:0:0 + 0.6% AA/AM | 170 | 3031 |

The AA/NVP copolymers of the invention provide improved compressive strength readings over previously known AA/AM fluid loss additives.

EXAMPLE II

A copolymer was prepared of and dimethyl-diallyl ammonium chloride (DMDAAC) and acrylic acid (AA) in a monomer ratio of 90:10 and having a molecular weight in the range of 400,000. Three samples of the copolymer were then added to a number of cement slurries formed using class H cement, water, and an existing liquid naphthalenesulfonic acid dispersant (LD). The concentrations of liquid materials are expressed in gallons per hundred sacks of cement (ghs). The results of testing are shown in Table V.

TABLE V

| AA/DMDAAC Sample (ghs) | | | LD | Cons. | | API FL | Pump Time | Cons. | | API FL |
|---|---|---|---|---|---|---|---|---|---|---|
| 1 | 2 | 3 | (ghs) | 80° | 118° | 118° | 125° Hr:Min | 80° | 197° | 197° |
| — | — | — | — | — | — | — | 3:37 | — | — | — |
| 40 | — | — | — | — | — | — | 1:38 | — | — | — |
| — | 40 | — | — | — | — | — | 1:52 | — | — | — |
| — | — | 40 | — | — | — | — | 1:40 | — | — | — |
| — | — | — | 3 | 11 | 13 | 26 | — | — | — | — |
| 40 | — | — | 3 | 14 | 17 | 192 | — | 23 | 27 | 337 |
| — | 40 | — | 3 | 19 | 14 | 28 | — | 31 | 23 | 170 |
| — | — | — | 3 | 8 | 10 | 244 | — | — | — | — |
| 20 | — | — | 3 | 12 | 11 | 302 | — | — | — | — |
| — | 20 | — | 3 | 15 | 14 | 115 | — | — | — | — |
| — | — | 20 | 3 | 10 | 10 | 782 | — | — | — | — |
| 20 | — | — | — | 8 | 12 | 681 | — | — | — | — |

TABLE V-continued

| AA/DMDAAC Sample (ghs) | | | LD (ghs) | Cons. 80° | 118° | API FL 118° | Pump Time 125° Hr:Min | Cons. 80° | 197° | API FL 197° |
|---|---|---|---|---|---|---|---|---|---|---|
| 1 | 2 | 3 | | | | | | | | |
| — | 20 | — | 10 | 12 | | 447 | — | — | | — |

Concentrations of 40 ghs of the liquid AA/DMDAAC copolymer provide fluid loss control up to about 200° F.

An invention has been provided with several advantages. The copolymers of AA/NVP provide good cement consistency without the use of a dispersant and can be used with monovalent and divalent chloride salts with no adverse affect upon fluid loss. The AA/NVP and AA/DMDAAC copolymers of the invention when combined with a dispersant exhibit superior fluid loss control at low concentrations up to at least about 200 degrees F. The AA/NVP copolymers of the invention do not retard the cement slurry even at the higher temperatures tested.

While the invention has been shown in only two of its forms, it is not so limited but is susceptible to various changes and modifications without departing from the spirit thereof.

We claim:

1. A method of cementing a well bore, comprising the steps of:

mixing together a hydraulic cement, water in an amount to produce a pumpable slurry, and a fluid loss additive which comprises a copolymer of a first monomer of dimethyldiallyl ammonium chloride and a second anionic monomer having a functionality selected from the group consisting of carboxlyate and sulfonate, the monomer ratio of said nonionic water soluble monomer to said anionic monomer being in the range from about 85:15 to 95:5, and said copolymer having a molecular weight in the range from about 200,000 to 400,000;

pumping said cement slurry to the desired location in said well bore; and allowing said cement slurry to harden to a solid mass.

2. The method of claim 1, wherein said second anionic monomer is selected from the group consisting of acrylic acid and methacrylic acid.

3. A method of cementing a well bore, comprising the steps of:

mixing together a hydraulic cement, water in an amount to produce a pumpable slurry, and a non-retarding fluid loss additive which comprises a copolymer of a first monomer of dimethyl-diallyl ammonium chloride and a second anionic monomer having a carboxylic acid functionality, the monomer ratio of said first monomer to said second anionic monomer being in the range from about 85:15 to 95:5 and said copolymer having a molecular weight in the range from about 200,000 to 400,000;

adding a sulfonated naphthalene dispersant to said cement slurry;

pumping said cement slurry to the desired location in said well bore; and allowing said cement slurry to harden to a solid mass.

* * * * *